Figure 1:
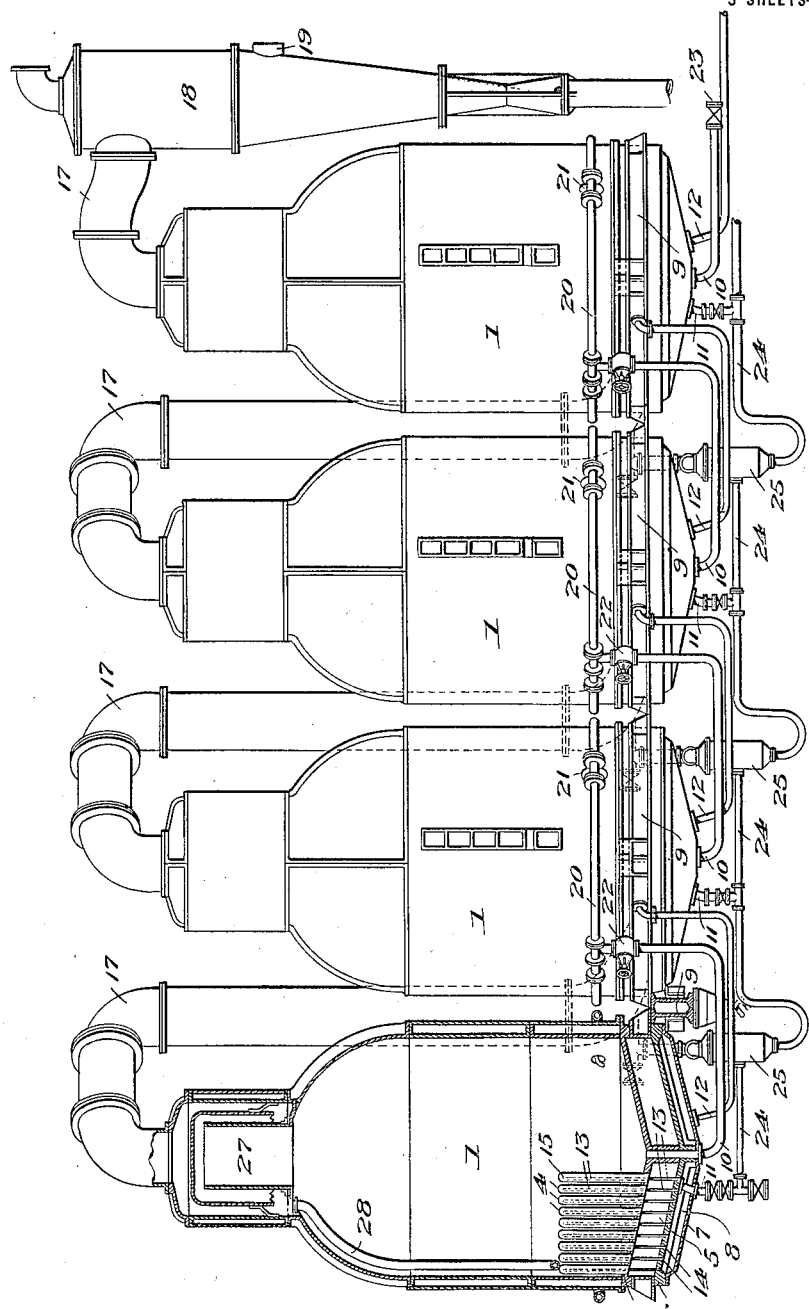

T. F. SANBORN.
EVAPORATING PROCESS.
APPLICATION FILED JAN. 16, 1912.

1,143,074.

Patented June 15, 1915.
3 SHEETS—SHEET 1.

T. F. SANBORN.
EVAPORATING PROCESS.
APPLICATION FILED JAN. 16, 1912.

1,143,074.

Patented June 15, 1915.
3 SHEETS—SHEET 3.

WITNESSES

INVENTOR
Thornton F. Sanborn
by Geo. N. Schulze
his Attorney

UNITED STATES PATENT OFFICE.

THORNTON F. SANBORN, OF NEW YORK, N. Y., ASSIGNOR TO SANBORN EVAPORATOR COMPANY, OF NEW YORK, N. Y., A CORPORATION OF DELAWARE.

EVAPORATING PROCESS.

1,143,074.      Specification of Letters Patent.      Patented June 15, 1915.

Original application filed December 28, 1910, Serial No. 599,773. Divided and this application filed January 16, 1912. Serial No. 671,501.

*To all whom it may concern:*

Be it known that I, THORNTON F. SANBORN, a citizen of the United States, residing at New York, county of New York, and State of New York, have invented certain new and useful Improvements in Evaporating Processes, of which the following is a specification.

This invention relates to evaporating processes.

The process constituting the present invention is preferably used in the evaporation of sugar solutions, but is also adapted for use in the evaporation of salt solutions or any other liquid.

An evaporating apparatus such as set forth in my Patent No. 1,028,792, dated June 4, 1912, may be conveniently used in carrying out the present process, such apparatus being disclosed herein to illustrate one means to that end. The present application is a division of the application on which said Patent No. 1,028,792 was granted.

In the evaporation of sugar juice, brine and other liquids from which the solid material may be obtained by evaporation, a convenient apparatus for that purpose utilizes one or more cells of "effects" in which the liquid to be evaporated is subjected to heat derived from pipes or tubes to which steam or other heating medium is supplied, and these cells or effects are subjected to vacuum or reduced pressure to cause the partially evaporated juice and the vapors arising from ebullition to pass from one cell or effect to another in succession.

In carrying out an evaporating process by apparatus such as set forth, difficulty has heretofore been experienced in securing uniform heating and the greatest possible heating effect on the juice in each cell due to the accumulation of non-condensable gases within the heating tubes or pipes on which the juice is dependent for heat, resulting in deadening the heating effect of the steam on the juice at certain areas of the heating tubes, thus increasing the cost of operation and decreasing the efficiency of the apparatus and evaporating process. These non-condensable gases possess a certain heating effect which is lost on account of their accumulation in the heating tubes, whereas such heating effect might be utilized in subsequent cells of the series.

The process which constitutes the present invention has for its object the elimination of the non-condensable gases from the heating tubes or pipes in either a single cell or multiple cell evaporating apparatus, and the process consists, first, in drawing off the non-condensable gases either by vacuum or reduced or lower pressure so that there will be no deadening of the heating effect of the steam or other heating medium on the juice being evaporated, and in this respect the invention consists, broadly, in applying this process to a single cell or a plurality of cells, and the process may be carried out by drawing the non-condensable gases from each cell by itself or from all the cells together when used as a multiple evaporating apparatus.

The invention consists, secondly, in drawing off by vacuum or reduced pressure, the non-condensable gases from the heating tubes of the different cells of a multiple evaporating apparatus and conveying them from the heating tubes of one cell to the heating tubes of a succeeding cell for the utilization of the heat of said non-condensable gases on the juice of the succeeding cell, whereby not only is the heat deadening effect of the non-condensable gases on the juice of a preceding cell obviated, but the available heat of the non-condensable gases thus eliminated is made use of in assisting in the heating of the juice in the succeeding cell.

The present process, thirdly, consists in the process of separating the vapor or entrained steam or other heating medium from the water of condensation of a cell and delivering such vapor or entrained steam to the heating tubes or pipes of a succeeding cell for the utilization of the heat thereof.

Figure 2:
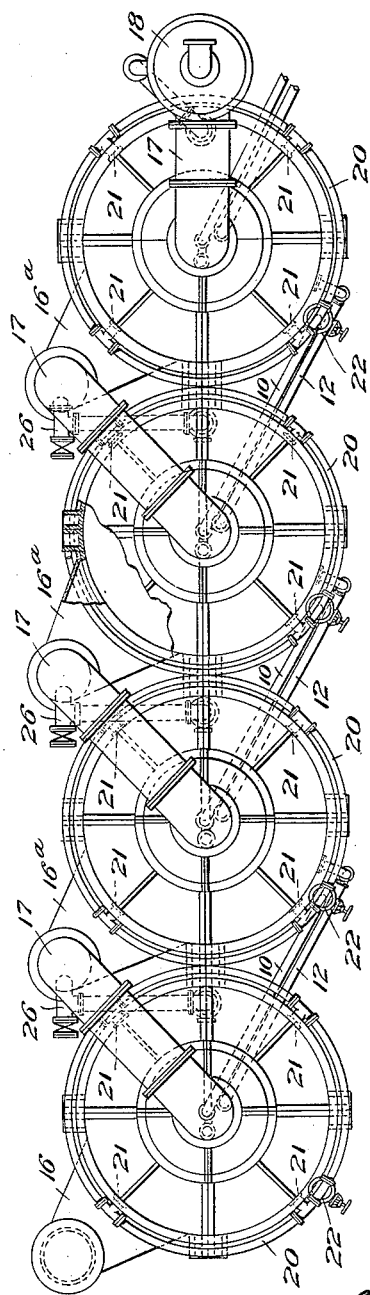
Figure 3:
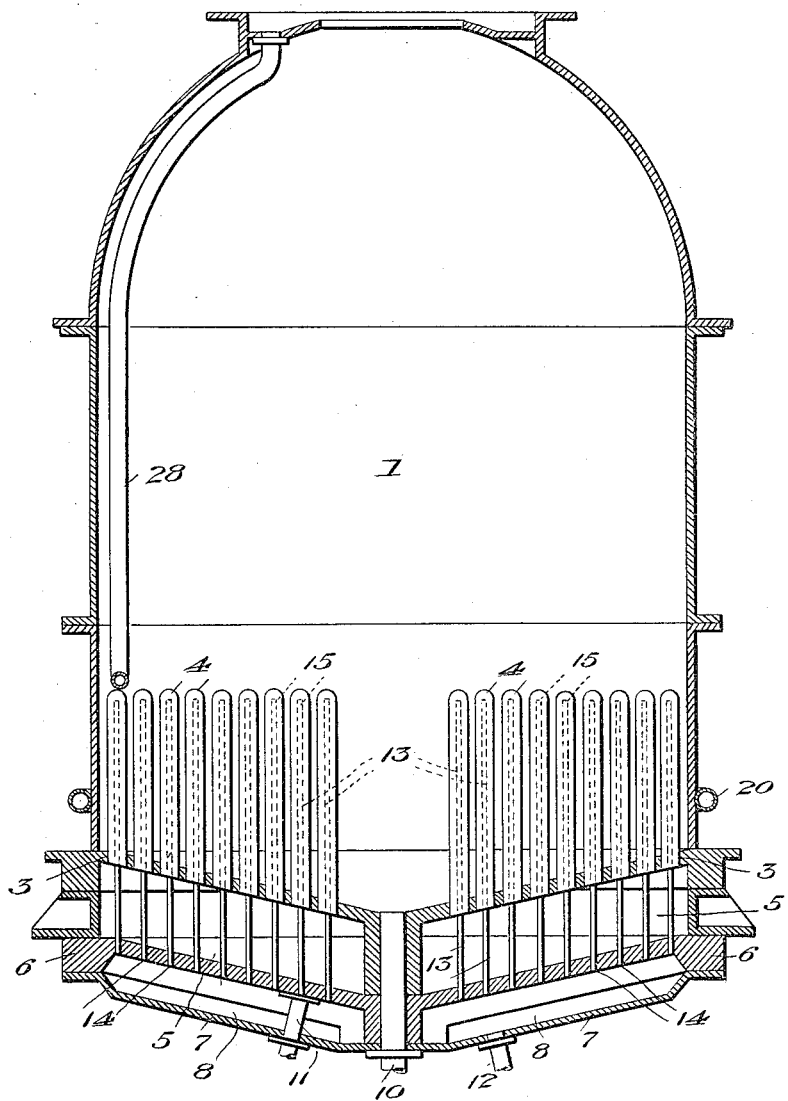

In the accompanying drawings, Figure 1 is a side elevation of a quadruple effect adapted for carrying out the present process, one of the cells being in section and only a portion of the heating tubes and take-off tubes being shown; Fig. 2, a plan view thereof; and Fig. 3, a vertical section through one of the cells, the tubes being in full and dotted lines and the separator being removed.

The drawings show a multiple effect like that disclosed in my Patent No. 1,028,792, dated June 4, 1912, which is adapted for carrying out the process set forth in the present application.

The cells or effects 1 may be used singly or in any desired multiples, a quadruple effect being illustrated. The cells or effects are of the same construction and the description of one only will be given.

The cell has a bottom or tube sheet which is inclined, being preferably of the conical form shown. Expanded into the bottom or tube sheet 2 at 3 are concentric circles of individual heating pipes or tubes 4 whose upper ends are closed. These heating tubes may be of copper, brass, iron, or other suitable material according to the character of the liquid to be evaporated. Their only openings are their mouths at their lower ends which open into the steam or heating chamber 5 below said bottom or tube sheet 2 and defined by the head or bottom plate 6. Below the head or bottom plate 6 is a plate 7 which, in connection with head 6, defines a non-condensable gas chamber 8. The sheets or plates 2, 6 and 7 are suitably secured together and to the body of the cell, the respective cells or effects being supported by channel and I-beams 9 in turn suitably supported on columns or other suitable foundation.

The sheets or plates 2, 6 and 7 are substantially parallel, being of concaved or dished form so that the juice will gravitate from the bottom of sheet 2 through the juice outlet pipe 10, the water of condensation will pass out through the outlet 11 and the non-condensable gases will pass out readily through the outlet 12.

The steam from chamber 5 which passes into the heating tubes 4, heats the juice in the cell and keeps it boiling. A certain amount of this steam will condense within the tubes 4 and flow by gravity into the chamber 5 and drain off through the outlet 11 but considerable volumes of non-condensable gases are evolved which, in practice, tend to remain in the heating tubes of whatever type may be employed in the cell, thus deadening the heating effect of the steam on the juice at certain areas of the tubes. The present process overcomes this tendency of the non-condensable gases to accumulate in the heating tubes 4 by removing such non-condensable gases from the tubes. This is accomplished by the provision of the take-off tubes 13 which open at their lower ends 14 into the chamber 8 and extend up through chamber 5 into the respective heating tubes 4 to near or at the top or closed upper ends thereof, into which they open at 15. Were the take-off tubes not employed, the tendency of these non-condensable gases would be to remain in the upper parts of the heating tubes and to deaden them, but a vacuum, as will presently appear, is made to act on the tubes 13 and cause all non-condensable gases to be drawn down from the heating tubes 4 through said tubes 13, into the chamber 8 and out through the outlet 12 so that every part of the heating tubes 4 is effective in conveying heat to the juice in the cell and the drainage and carrying off of the non-condensable gases is insured, all of the heating tubes being under uniform pressure at all times so that each receives its full quota of steam and the juice is uniformly heated. The upright disposition of the heating tubes permits the free upward passage of the steam or heating vapor—the normal direction of travel—which is aided by the condensation occurring within the tubes and the take-off effect at the upper ends thereof due to the vacuum in the tubes 13. The heating tubes and the take-off may extend into the evaporating chamber from the bottom thereof, the sides, or the top, rather than disposed at the bottom of the evaporating chamber, my process, in this respect, consisting in the elimination of the non-condensable gases from heating tubes, regardless of the arrangement of the latter or the means for effecting the withdrawal of such gases.

The arrangement permitting of the perfect and uniform heating of all of the heating tubes by the steam, the natural expansion of the tubes may be availed of to aid in the removal of incrustations that may accumulate on the outside of the tubes for, by merely raising the temperature of the cell, a greater expansion of the heating tubes 4 occurs, which, being inside the film of incrustation, flakes it off.

The steam is admitted to the first cell of the series through the inlet 16 (Fig. 2), directly entering chamber 5. The upper part of each cell, save the last of the series, is connected to the steam space 5 of the succeeding cell by a vapor pipe 17, the vapor pipe of the final cell or effect being connected to the condenser 18 which is coupled at 19 to a suitable vacuum pump whereby a vacuum, graded in degree from the weakest in the first cell to the strongest in the final cell of the series, is maintained in said cells.

The respective cells have juice supply pipes 20 which have juice inlets 21 leading to the cell. The juice is initially supplied to the pipe 20 of the first cell; the outlet pipe 10 of each cell, save the last of the series, being connected to the pipe 20 of the succeeding cell, suitable valves 22 being interposed at points of the piping for the control of the juice. The juice outlet from the final cell or effect is coupled to a pump at 23.

All of the condensation water outlets 11 are connected to a line of piping 24 in which is interposed separators 25 which are in turn connected by pipes 26 to the vapor inlets 16$^a$, of all cells following the first of the series so that any steam or vapor accompanying the water of condensation is delivered directly to the steam chamber 5 of the succeeding cell and thus the full heating effect is conserved.

The non-condensable gases passing out through the outlet 12 are preferably taken to the steam space 5 of the succeeding cell for the utilization of the heat thereof, which constitutes another part of my process.

Each cell may have a separator 27 provided with a back flow or drain pipe 28 for the delivery back into the cell of any juice which may have entrained with the vapor passing from the cell.

It is preferable for rapid and economical operation that the admission of thin juice to the first cell or effect and its transit from cell to cell and its withdrawal as a finished product from the final cell or effect be a continuous, regular operation but not necessarily so because the juice may be taken off from any cell.

As a part of my process it is preferable, though not necessary, that the water of condensation be separated and any entrained steam carried into the steam space of the succeeding cell; also, that the non-condensable gases of one cell be led to the steam space of a succeeding cell, to utilize the heat of such gases in the succeeding cell, but the invention is not limited to this successive treatment as the water of condensation and the non-condensable gases may be taken off separately from the respective cells or effects without leading them from one cell to another cell.

In boiling in the first cell, the juice becomes heavier, and this partially evaporated liquid is drawn by the vacuum into the succeeding cell through the pipe 10 and again leaves that cell through the correspondingly designated pipe to pass to a following cell, further evaporation occurring in each cell and final evaporation in the final cell or effect, the finished product being withdrawn by the pump coupled at 23.

Having thus described my invention, what I claim as new and desire to secure by Letters Patent, is:—

1. In an evaporating process, heating the material to be evaporated in a cell by introducing a heating medium into pipes or tubes which are in contact with the material in the cell but out of fluid communication therewith, and substantially separately withdrawing the non-condensable gases from within said heating pipes or tubes by inner tubes which are out of communication with the material in the cell.

2. In an evaporating process, heating the material to be evaporated in a cell by introducing a heating medium into pipes or tubes in contact with the material in the cell, withdrawing the non-condensable gases from within said heating pipes or tubes separately from the withdrawal of the heating medium therefrom, and conducting the withdrawn non-condensable gases to the heating pipes or tubes of a succeeding cell for the utilization of the heat thereof.

3. In a vacuum evaporating process, heating the material to be evaporated in a plurality of cells by introducing steam into pipes or tubes in contact but out of communication with the material in each cell, withdrawing by the vacuum applied to a succeeding cell the non-condensable gases from the heating pipes or tubes of a preceding cell and by vacuum introducing such withdrawn non-condensable gases to the said heating pipes or tubes of a succeeding cell for the utilization of the heat thereof, separating the steam from the water of condensation flowing from the pipes or tubes aforesaid and conveying such separated steam from one cell to the said heating pipes or tubes of another cell for the utilization of the heat thereof.

In testimony whereof, I hereunto affix my signature in presence of two witnesses.

THORNTON F. SANBORN.

Witnesses:
M. L. NEWCOMB,
S. V. LOCKWOOD.

Copies of this patent may be obtained for five cents each, by addressing the "Commissioner of Patents, Washington, D. C."